Figure 1:
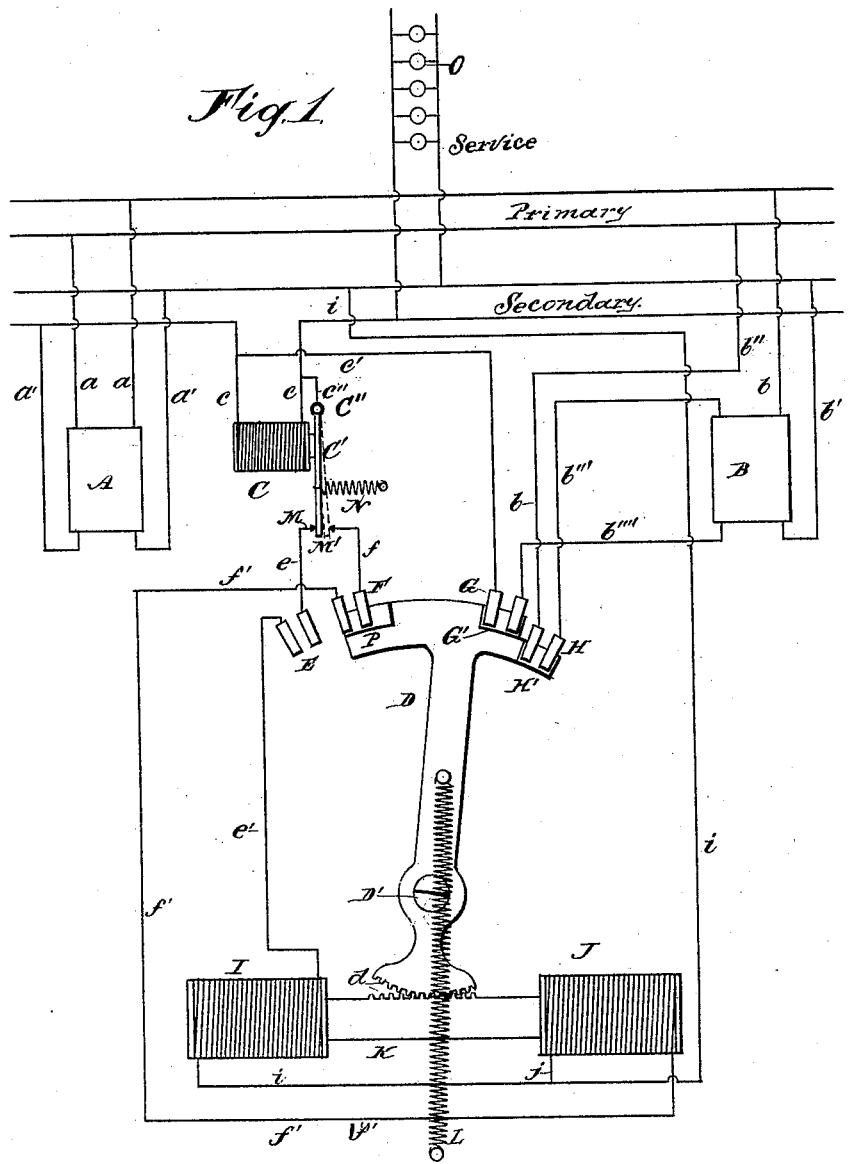

(No Model.) 2 Sheets—Sheet 1.
W. J. GREENE.
AUTOMATIC CUT-OUT FOR ELECTRICAL CONVERTERS.
No. 544,094. Patented Aug. 6, 1895.

Attest
Frank Christle.
J. W. Kouba

Inventor
William J. Greene.
By J. M. St. John,
Atty.

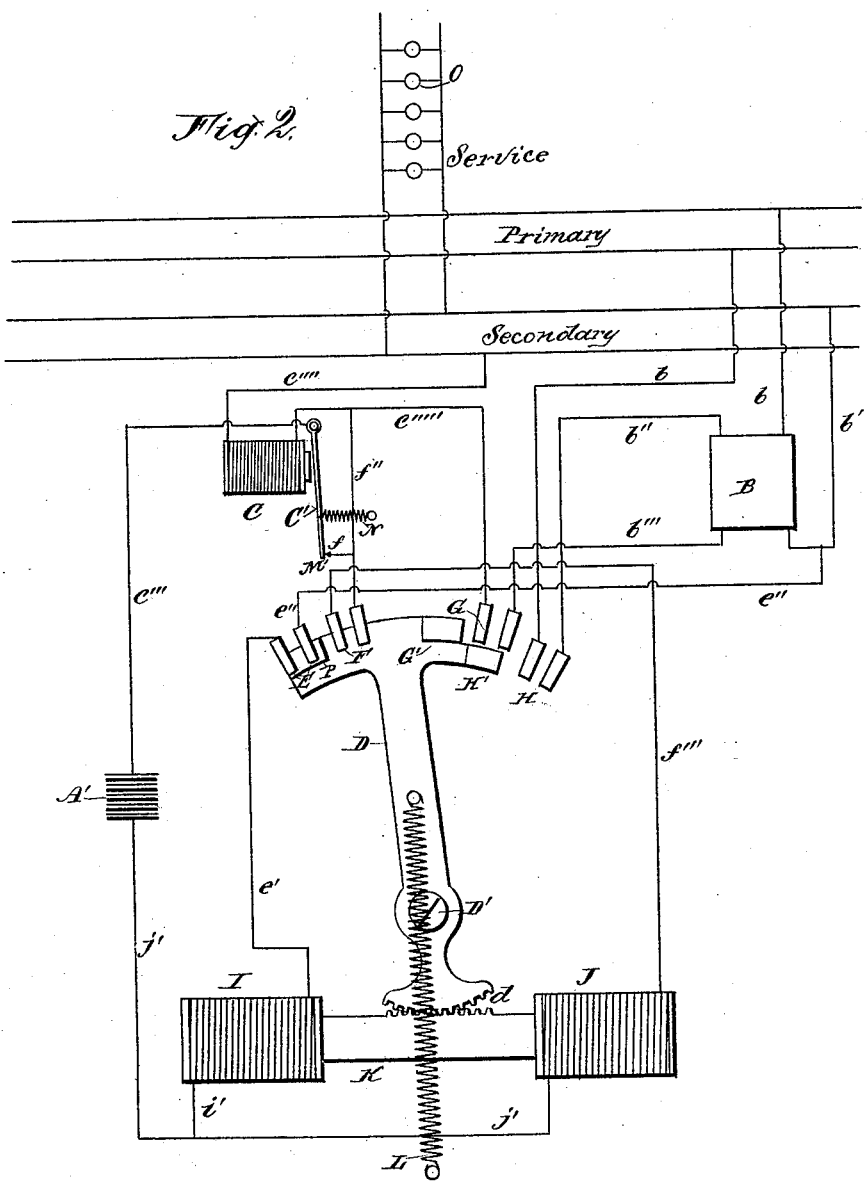

UNITED STATES PATENT OFFICE.

WILLIAM J. GREENE, OF CEDAR RAPIDS, IOWA.

AUTOMATIC CUT-OUT FOR ELECTRICAL CONVERTERS.

SPECIFICATION forming part of Letters Patent No. 544,094, dated August 6, 1895.

Application filed March 9, 1895. Serial No. 541,191. (No model.)

*To all whom it may concern:*

Be it known that I, WILLIAM J. GREENE, a citizen of the United States, residing at Cedar Rapids, in the county of Linn and State of Iowa, have invented certain new and useful Improvements in Automatic Cut-Outs for Electrical Converters; and I do hereby declare the following to be a full, clear, and exact description of the invention, such as will enable others skilled in the art to which it appertains to make and use the same.

The object of this invention is to limit the waste in the operating of electrical light and power systems by providing means for automatically cutting in or out of circuit such converters as are not at certain times required.

The invention consists in apparatus adapted to accomplish this purpose, and will be hereinafter described and claimed, reference being had to the accompanying drawings, in which—

Figure 1, Sheet 1, is an ideal view of an electrical system provided with apparatus embodying my invention, and in which the electrical energy for actuating the automatic cut-out is supplied by the same source as that employed for light or power. Fig. 2, Sheet 2, is a similar view, but with such a modification in construction and arrangement as to admit of the use of an auxiliary source of electrical energy to give initial action to the cut-out.

Similar letters of reference indicate corresponding parts.

In the operation of alternating systems of electrical distribution it is general to connect the light or other service wires with a secondary circuit energized from one or more converters charged from the primary circuit. In all such cases there are times when some of the converters are not required for service, as in the case of lamp-circuits in the day-time or exclusively power-circuits during the night, or some part thereof. It is, therefore, desirable that at such times certain converters should be entirely cut out. By this means the waste of power due to converter leakage is reduced or obviated and a considerable item of unnecessary expense is cut off. To accomplish this desirable result automatically is the object of this invention, as above stated. Apparatus for this purpose will now be described.

Referring now to Fig. 1, A designates a converter connected with the primary and secondary mains in the usual way. To the secondary mains are connected the service-wires in the usual manner, supplying electrical energy to the lamps or motors O. One of the secondary wires forms a loop $c\ c$ and connects with the coil of an electromagnet or solenoid C. This is provided with a suitable armature C', pivoted at C'', with suitable means for drawing it away from said electromagnet or solenoid, as the spring N or gravity. The free end of this armature is adapted to impinge upon the terminals M M' of the wires $e$ and $f$, respectively, for a purpose which will be hereinafter explained.

The converter A, as indicated, is permanently connected. The converter B is supposed to represent one of those supplying the service-current to the secondary mains, and thence to the service-wires. It connects directly with one of the primary and one of the secondary wires through wires $b$ and $b'$, respectively. Its other connection with the primary wire is through wires $b''\ b'''$ and a switch H. Its connection with the other secondary wire is through wires $b''''\ c'$ and a switch G. These switches consist of the wire-terminals G and H and suitable contact-plates G' and H' on a switch-lever D. This lever is pivoted at D' and has a suitable connection with the armature K of a pair of solenoids or electromagnets I J, as by rack and toothed segment $d$. A spring L serves to aid the solenoids in throwing the switches into contact as soon as the switch-lever passes the center of motion in either direction.

The solenoids I J are energized by electrical currents derived as follows: A wire $i$ connects with one of the secondary wires and at the other end with a terminal of the coil of the solenoid I. To the other terminal of said coil is connected a wire $e'$, terminating at a switch E. The other terminal of this switch is connected with a wire $e$, having a terminal M at the other end. The switch is closed by a suitable contact-plate P on the switch-lever D. By contact of the terminal M with the armature C' and a connection of the other end of the armature by a wire $c''$ with the loop $c$ in the other secondary wire this auxiliary circuit is completed, and, as will be seen, is brought into circuit with the permanent converter A—that is to say, the circuit through said converter, electromagnet C, and solenoid I is completed on the closing of the secondary circuit, which is effected by turning in a lamp or motor. The effect of this is, of course, to energize the solenoid I and throw the switch to the position shown in Fig. 1, thereby cutting in the other converter, as will be readily seen.

In the position shown in Fig. 1 the switch F is closed. One terminal of this switch connects by a wire $f$ with one of the terminals M'. The other connects with a wire $f'$ leading to one terminal of the coil of the solenoid J. The other end of this coil connects by a wire $j$ with the wire $i$. The operation of this part of the device is as follows: When the energy of the current in the secondary mains is diminished to a certain predetermined amount, as by the turning out of all or nearly all of the lamps, the magnetism in the magnet C becomes insufficient to hold the armature C' in contact, owing to the opposite pull of the spring N, and the armature is accordingly drawn away from the magnet and makes contact with the terminal M'. This closes the circuit through the coil of the solenoid J, energizing said solenoid, and thus throwing the switch-lever over to the position shown in Fig. 2, completely cutting out the converter B.

It is to be understood that the object in having the converter A permanently connected is to furnish current for initial action when all the lamps, motors, or the like are turned off and the other converters cut out. The converter A may therefore be one specially for this purpose, or one needed for other and practically continuous service. It is evident that this initial action, which arises from the energizing of the solenoid I, may be effected through an independent source of electrical energy, such as an independent battery or dynamo. The electrical connections in such a case are somewhat modified, as illustrated in Fig. 2.

A' designates an independent battery or dynamo. This is connected by wires $j'$ and $i'$ with the solenoids J and I, respectively. The other element is connected by a wire $c'''$ with the armature C'. One end of the coil of the electromagnet C has a connection through $c''''$ with one of the secondary mains, and the other end through $f f''$ and $c'''''$ with the other end of the armature C', the switch F, and the switch G, respectively. The other connection with the secondary mains is made through $e'$, the switch E, and $e''$. It will be seen that in this position, Fig. 2, the converter B is cut out, and the independent circuit is cut in by the switch E. On closing this circuit, as by the turning on of a lamp, the solenoid I is energized and the switch is thrown to the position shown in Fig. 1, cutting in the converter B and cutting out said independent circuit. In this position the solenoid J is energized through $j' f f'''$, the switch F, and the armature C' as soon as the current passing through the coil of the electromagnet C becomes weak enough to release the armature, as by the turning out of all of the lamps or motors.

Having thus described my invention, I claim—

1. In an automatic cut-out for electrical converters the combination of a switch-lever, the working or service converter, contact plates carried by said switch-lever and adapted to connect and disconnect said converter from primary and secondary mains, a pair of electro-magnets or solenoids adapted to operate said switch-lever, and means for alternately energizing said electro-magnets or solenoids, consisting of a permanent source of electrical energy, and an electro-magnet in series with the secondary circuit and having an armature in electrical connection with the secondary circuit and connections through said electro-magnet, armature and secondary circuit whereby said armature alternately connects said electro-magnets or solenoids with said permanent source of electrical energy.

2. The combination with a permanent source of electrical energy, and primary and secondary mains communicating therewith, of the converter B in circuit with the primary and secondary mains through switches G and H, the electro-magnet C in circuit with one of the wires of said secondary main, the armature C' having electrical connection with the secondary main, and provided with the spring N, the terminals M M', switches E F, switch-lever D, electro-magnets I and J, and electrical connections thereof with the contact-points M M', substantially as and for the purpose set forth.

In testimony whereof I affix my signature in presence of two witnesses.

WILLIAM J. GREENE.

Witnesses:
J. M. St. John,
F. J. Kubicek.